United States Patent [19]

Dosdall et al.

[11] Patent Number: 5,056,360
[45] Date of Patent: Oct. 15, 1991

[54] SELECTION OF VELOCITY INTERVAL FOR POWER STROKE ACCELERATION MEASUREMENTS

[75] Inventors: James M. Dosdall, Grosse Ile; John V. James, Walled Lake, both of Mich.

[73] Assignee: Ford Motor Company, Dearborn, Mich.

[21] Appl. No.: 572,282

[22] Filed: Aug. 24, 1990

[51] Int. Cl.$^5$ ............................................. G01M 15/00
[52] U.S. Cl. ........................................................ 73/116
[58] Field of Search .......................... 73/112, 116, 117.3

[56] References Cited

U.S. PATENT DOCUMENTS

| | | |
|---|---|---|
| 3,972,230 | 8/1976 | Hanson et al. |
| 4,064,747 | 12/1977 | Rackliffe et al. |
| 4,179,922 | 12/1979 | Bouverie et al. |
| 4,292,670 | 9/1981 | Reid et al. |
| 4,295,363 | 10/1981 | Buck et al. |
| 4,398,259 | 8/1983 | Levine |
| 4,532,592 | 7/1985 | Citron et al. |
| 4,691,288 | 9/1987 | Kay et al. |
| 4,697,561 | 10/1987 | Citron |
| 4,932,379 | 6/1990 | Tang et al. |

OTHER PUBLICATIONS

James et al, "Microprocessor Based Data Acquisition for Analysis of Engine Performance", SAE Tech. Paper Series, No. 870386, Feb. 1987.

Primary Examiner—Robert Raevis
Attorney, Agent, or Firm—Mark Mollon; Roger L. May

[57] ABSTRACT

Engine crankshaft velocity is determined during each firing interval of an engine. Pairs of velocities are combined to yield acceleration measurements indicating the work done by a particular cylinder in its power stroke. A deviation of a particular acceleration value from that of neighboring values denotes a lack of power in the corresponding cylinder. The width and the phase of each velocity interval are used which provide accurate and substantially independent acceleration measures for each power stroke. Specifically, the width of each interval is preferably between about 45°-180° of engine rotation. Each interval has a phase in relation to its respective power stroke such that the drop in acceleration occurring in a particular power stroke causes a maximum drop in the calculated acceleration corresponding to that particular power stroke and causes a smaller but substantially equal drop in the calculated accelerations corresponding to the preceding and following power strokes. The velocity measurement intervals can be defined by position reference marking signals generated at rotational positions corresponding to a point within the power strokes where a maximum acceleration would approximately occur during a proper firing of the power stroke.

14 Claims, 6 Drawing Sheets

SELECTION OF VELOCITY INTERVAL FOR POWER STROKE ACCELERATION MEASUREMENTS

BACKGROUND OF THE INVENTION

The present invention relates in general to measurement of crankshaft acceleration in an internal combustion engine corresponding to each of a plurality of engine cylinder power strokes, and more specifically to the selection of a particular interval occurring once per power stroke for measuring a velocity to be used in calculating the accelerations.

In the typical four-stroke internal combustion engine, the four strokes include the intake stroke, the compression stroke, the power stroke, and the exhaust stroke One engine cycle is comprised of 720° of crankshaft rotation during which each cylinder passes through each of its four strokes. In any engine having more than four cylinders, the power strokes of different cylinders overlap.

Gas pressure from combustion in a properly firing cylinder accelerates the engine crankshaft during the power stroke of that particular cylinder If a cylinder misfires instead of properly firing, then friction, compression in other cylinders, and external load combine to produce a net deceleration during the power stroke. By virtue of its mass and the arrangement of cylinders, an engine is intentionally designed to provide smooth rotation. Therefore, the velocity changes resulting from the accelerations and decelerations is small compared to total rotational velocity The decline in rotational velocity during a single completely misfiring power stroke is less than 3% and typically is only a fraction of 1%. The overlapping of power strokes in engines having more than four cylinders further masks the velocity effect of a misfiring cylinder.

Nevertheless, there have been many attempts at performing engine diagnosis by measuring velocity fluctuations of the engine crankshaft. Specifically, measurements of velocity have been used to characterize engine acceleration, torque, and/or cylinder power contribution. The use of velocity measurements to obtain such engine parameters has the advantage of being noninvasive into the engine itself. However, none of the prior attempts have had the sensitivity or reliability to allow accurate diagnosis of individual power strokes.

Most prior techniques have attempted to examine velocity fluctuations within the power stroke, such as by measuring instantaneous crankshaft velocity at predetermined points within a power stroke. For example, Rackliffe et al, U.S. Pat. No. 4,064,747, teaches a system wherein two or more measurements of instantaneous, subcyclic speed within each power stroke are taken. The measurements are separated by a significant portion of the stroke. The difference in instantaneous speed is a measure of acceleration during that stroke. The relative acceleration between different power strokes gives the power contribution for a single power stroke.

Buck et al, U.S. Pat. No. 4,295,363, likewise teaches a system wherein a plurality of time intervals in each power stroke are measured to determine instantaneous, subcyclic speed. Buck et al describes a compression test conducted while cranking an engine without a fuel supply, and a low power test conducted only during a predetermined engine acceleration.

Citron et al, U.S. Pat. No. 4,532,592, determines an acceleration for a power stroke of a particular cylinder by measuring an instantaneous speed at the cylinder's top dead center (TDC) and at the top dead center of the next cylinder in the firing order. The difference of the instantaneous speed at the successive stop dead centers provides the acceleration for the particular power stroke. Citron et al, U.S. Pat. No. 4,697,561, discloses a modification where the instantaneous speeds for forming an acceleration measurement are the lowest speed point and the highest speed point within the velocity fluctuation of the power stroke.

The attempts to examine an instantaneous velocity during the fluctuations occurring within a power stroke have proven to be undesirable for several reasons. A principal disadvantage with such instantaneous velocity measurements is the presence of large errors in the measurements since the ratio of the position tolerance of the mechanical position indicators to the rotational angles being measured is large. In order to minimize errors, special position indicating mechanisms are required that have extremely high resolution and are formed according to exact tolerances to provide highly accurate position references.

When the velocity measuring interval (i.e., rotation angle) is small in order to closely approximate instantaneous speed, the amount of noise in the measurements is large. Such a system is subject to uncontrollable (i.e., nonsystematic) position errors, such as are caused by gear lash and twisting of the crankshaft. Thus, it is difficult and expensive to provide power stroke diagnosis based on measurements of instantaneous velocity within the velocity fluctuations.

Another attempt at characterizing engine performance based on velocity differences employed one longer angle velocity measurement once per power stroke. As disclosed in James et al, "Microprocessor Based Data Acquisition For Analysis Of Engine Performance", SAE Technical Paper Series, No. 870386, February 1987, the average angular acceleration between cylinder firings can be used to detect individual cylinder misfires, provided very precise measurements are made of engine rotation. Engine velocity is measured over one profile ignition pulse (PIP) interval which occurs once per cylinder firing (e.g., once every 120° of crankshaft rotation in a six-cyinder engine). The PIP signal is a digital signal having a rising edge occurring at or just prior to top dead center of each respective engine cylinder. Although a misfiring cylinder does cause a dip in the acceleration measurements obtained using engine speed over each PIP interval, a single misfire may affect acceleration measurements corresponding to several consecutive firings so that it is not possible to identify the exact cylinder which misfired or the number of misfiring cylinders. Thus, accurate characterization of engine performance is not achieved.

Hanson et al, U.S. Pat. No. 3,972,230, detects misfires using crankshaft acceleration based on velocities measured using one pulse per power period. The velocity measurement periods are based on a tachometer signal and thus extend from one spark instant to the next. The resulting velocity intervals approximately correspond to an interval from top dead center to top dead center, but are necessarily somewhat variable. The lack of any fixed phase synchronization of the velocity intervals to crankshaft position and the approximate location of the intervals between top dead centers results in generally very high noise levels and in cross-coupling of misfire indications to adjacent power strokes.

Accordingly, it is a principal object of the present invention to provide a method and apparatus for deriving an acceleration measurement for each power stroke requiring just one velocity measurement per power stroke while avoiding the need to measure instantaneous speed at any point within the power stroke.

It is a further object of the present invention to obtain an acceleration measurement having a maximum contribution from a respective cylinder's power stroke and a minimum contribution from all other power strokes even in engines having overlapping power strokes.

It is further object of the invention to obtain velocity and acceleration data for an internal combustion engine in which a high signal-to-noise ratio is achieved.

SUMMARY OF THE INVENTION

These and other objects are accomplished by measuring a pair of velocities ($V_i$ and $V_{i+1}$) which are then combined to yield an acceleration ($A_i$) which is indicative of the work done by a particular cylinder (i) in its power stroke. The intervals for measuring each velocity are selected to be the same with respect to each particular cylinder's power stroke, and are therefore repeated at a spacing equal to once per cylinder firing. Furthermore, the width of the interval and the phase (i.e., starting position) of the interval are provided in a manner to achieve optimum signal-to-noise ratio and a maximum separation between measurements for adjacent power strokes. A relatively long width for the interval is selected, preferably amounting to a rotation angle equal to the angle between adjacent top dead centers. The interval has a phase in relation to its respective power stroke such that a misfire or drop in acceleration occurring in a particular power stroke causes a small but substantially equal drop in the calculated accelerations corresponding to the power strokes immediately preceding and immediately following the particular power stroke. In another aspect of the invention, the interval for measuring velocity $V_i$ and the interval for measuring velocity $V_{i+1}$ are substantially symmetrical with respect to a point within the selected power stroke i or just before the point where a maximum acceleration would approximately occur during a proper firing of power stroke i.

BRIEF DESCRIPTION OF THE DRAWINGS

The novel features of the invention are set forth with particularity in the appended claims. The invention itself, however, both as to its organization and method of operation, together with further objects and advantages thereof, may best be understood by reference to the following description taken in conjunction with the accompanying drawings, in which:

DETAILED DESCRIPTION OF PREFERRED EMBODIMENTS

Figure 1:
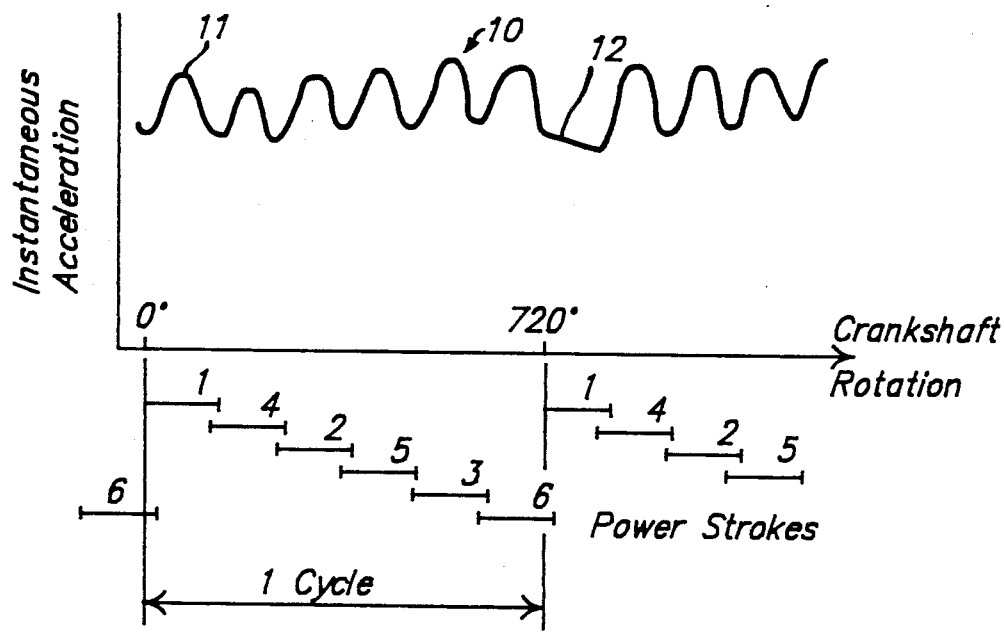
FIG. 1 is a plot showing instantaneous acceleration versus crankshaft rotation for normal and misfiring cylinders.

Curve 10 in FIG. 1 shows approximate acceleration fluctuation during engine operation. An instantaneous acceleration peak 11 occurs during the power stroke of cylinder No. 1. Other peaks occurring in the acceleration curve are shown as corresponding to each other properly firing cylinder. Thus, although power strokes overlap in engines with more than four cylinders (e.g., a six-cylinder engine as shown in FIG. 1), their individual effects are at least partially separable into distinct acceleration fluctuations which can be determined from velocity measurements made at a rate of once per cylinder firing.

When a misfire occurs such that no significant power is created by a cylinder during its power stroke, the crankshaft continues to decelerate throughout such rotation as illustrated at 12. The deceleration continues at least during the time that the misfiring cylinder is the only cylinder in its power stroke.

Figure 2:
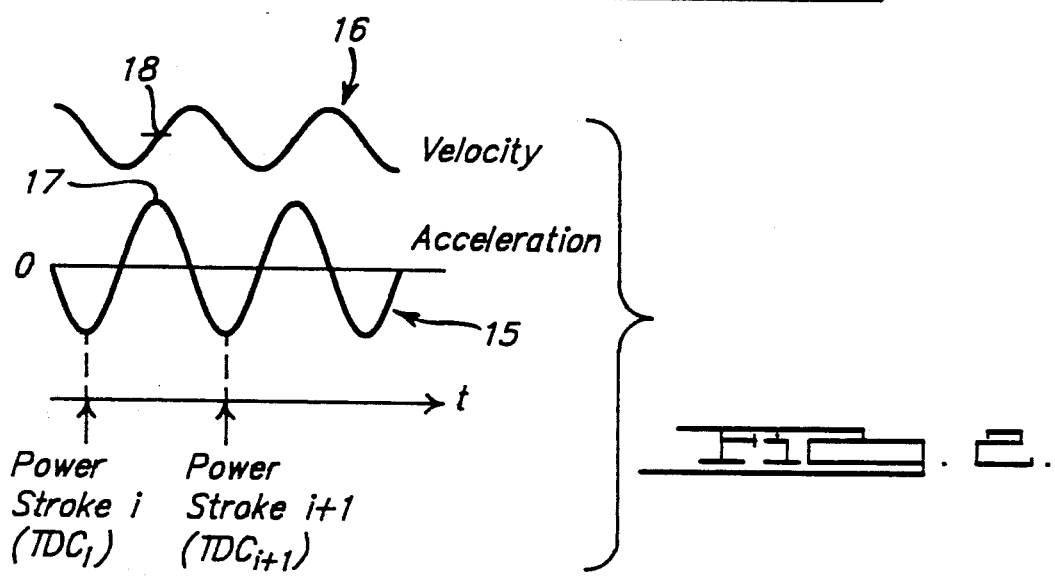
FIG. 2 is a plot showing a typical relationship between crankshaft velocity and crankshaft acceleration.

The accuracy required to measure angular rotation and time to derive the resolution shown in FIG. 1 is not feasible or desirable in on-board automotive systems. Rather, approximately one velocity measurement per power stroke is taken and the difference between successive velocities is calculated to determine one total acceleration measurement per power stroke. The relationship between acceleration and velocity is shown in FIG. 2 where a curve 15 shows crankshaft acceleration including a time period from the beginning of a power stroke i (beginning at top dead center of power stroke i, or $TDC_i$) and a power stroke i+1 beginning at $TDC_{i+1}$) An exemplary velocity curve 16 shows a velocity resulting from the crankshaft acceleration. FIG. 2 shows approximate behavior, the actual behavior of acceleration and velocity being more complicated due to gas compression effects and stroke overlap. However, the approximate waveforms of FIG. 2 are useful in defining a velocity measuring interval according to the present invention which results in acceleration measurements that accurately characterize the engine operation.

More specifically, FIG. 2 shows that the crankshaft is decelerating at the beginning of power stroke i. When proper cylinder combustion occurs during power stroke i, a positive acceleration results having a peak value at point 17. When acceleration is at its peak, the velocity fluctuation is approximately at its average value as shown at point 18.

Figure 3:
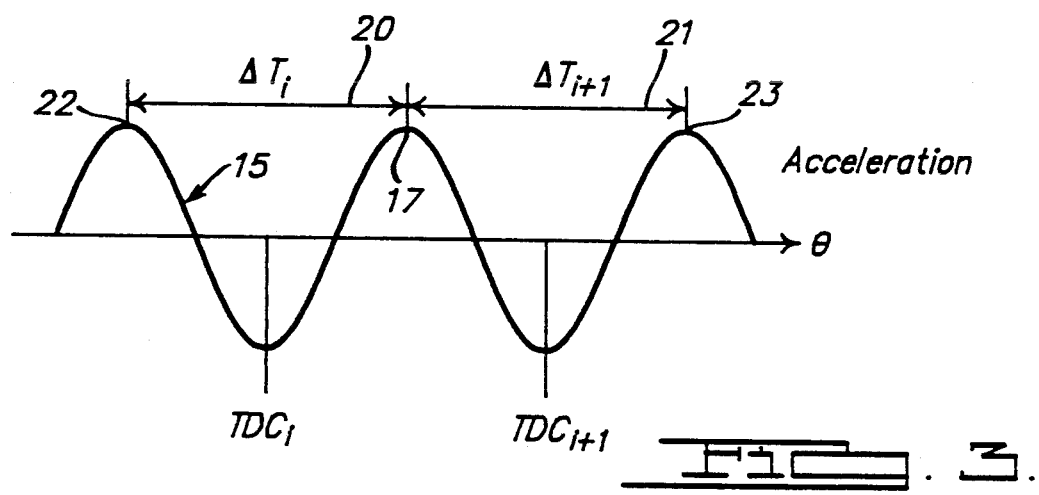
FIG. 3 is a plot showing a preferred arrangement for velocity measurement intervals according to the present invention.

According to the present invention, it has been found that rather than referencing velocity measurement intervals to approximate top dead center as in the prior art, a maximum separation between successive acceleration measurements is achieved by referencing the velocity measurement intervals to the point where maximum acceleration approximately occurs during a proper cylinder firing. As shown in FIG. 3, a pair of velocity intervals 20 and 21 are substantially symmetrical with respect to (e.g., have a meeting point at) maximum acceleration point 17. For convenience, interval 20 may begin at a prior maximum acceleration point 22 and interval 21 may end at a maximum acceleration point 23. Preferably, each velocity interval comprises at least about 45° of crankshaft rotation and up to about 180°.for a four-cylinder engine, up to about 120° for a six-cylinder engine, and up to about 90° for an eight-cylinder engine. Each interval is at least 45° to minimize the ratio of positioning error to angle being measured, but is no more than the angle between succesive TDC's so that one measurement can be taken for each power stroke during an engine rotation. Furthermore, intervals 20 and 21 need not be continuous and may be separated by a short time period centered on maximum acceleration point 17. However, by beginning and ending each interval at a maximum acceleration point, velocity measurement and acceleration calculations are simplified.

Figure 4:
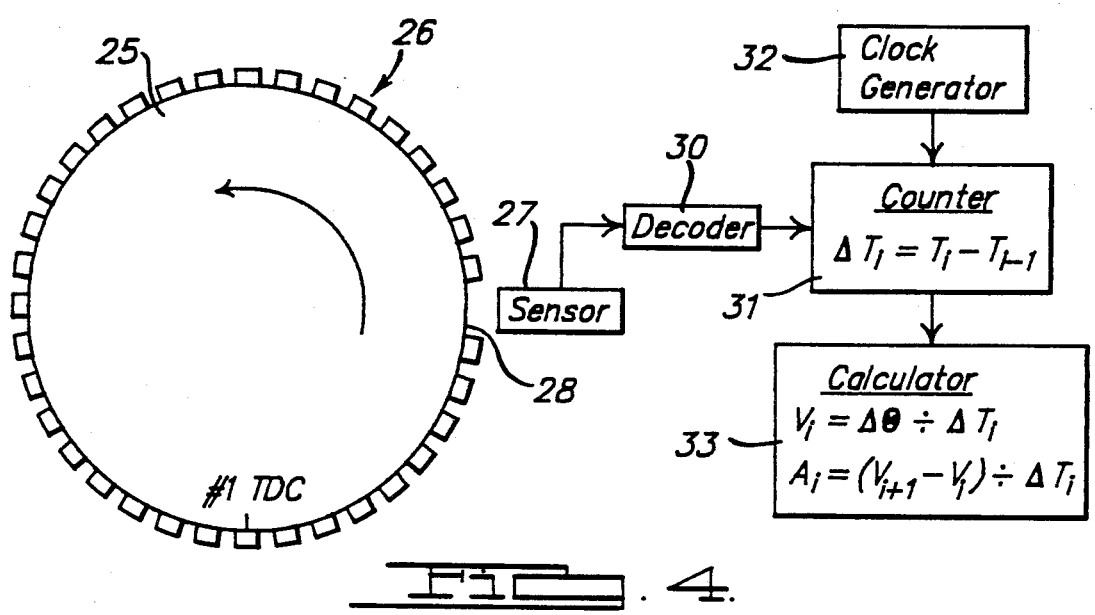
FIG. 4 is a block diagram showing measuring and calculating apparatus according to the present invention.

A first embodiment of apparatus according to the present invention is shown in FIG. 4. A multi-toothed wheel 25 is mounted on an engine for rotation with the crankshaft. A plurality of teeth 26 are disposed along the periphery of wheel 25 at a predetermined angular spacing. A sensor 27 is disposed in a fixed location closely spaced to teeth 26 for sensing when each tooth passes sensor 27. A missing tooth location 28 is provided on wheel 25 for providing an absolute location reference, for example, at 90° before top dead center of cylinder No. 1 as shown in FIG. 4.

Sensor 27 is connected to a decoder 30 which provides a decoded output to a counter 31. A clock signal is provided to counter 31 by a clock generator 32. A counter output is provided to a calculator 33 which calculates velocity and acceleration. Alternatively, decoder 30 could be placed between counter 31 and calculator 33 such that counter 31 would count the time between each tooth 26 and decoder 30 would add the appropriate counts together during the desired interval.

Preferably, teeth 26 are comprised of a magnetically permeable material and sensor 27 is comprised of a variable reluctance sensor. An approximately sinusoidal output voltage is provided from sensor 27 which can be applied to a trigger circuit (not shown) to produce a square wave signal having transitions indicating predetermined angular positions of the crankshaft. Missing tooth 28 can be detected by the occurrence of a time between tooth pulses which is substantially longer than the average time between pulses.

Sensor 27 provides position pulses at a higher resolution than needed in the present invention wherein each velocity measurement interval has an angular length between about 45°-180° of crankshaft rotation. Therefore, the sensor output signals are decoded by decoder 30 so that position marker signals are provided to counter 31 to identify the beginning and ending of respective velocity intervals as well as the cylinder to which the interval corresponds. In order to determine the number of clock pulses occurring during a velocity measurement interval, counter 31 reads the value of a clock register (not shown) at the beginning of the i−1 velocity interval ($T_{i-31\ 1}$) at the end of the i velocity interval ($T_i$). The difference in clock readings ($T_i - T_{i-1}$) provides the elapsed time during the velocity interval ($\Delta T_i$). Alternatively, counter 31 could include a resettable counter which is reset at the beginning of each velocity interval and which counts each clock pulse from clock generator 32. The elapsed time for each velocity interval is provided to calculator 33.

The velocity during the i interval ($V_i$) is inversely proportional to the elapsed time during the interval. Specifically, velocity $V_i$ equals the angular length of the velocity interval ($\Delta \theta$) divided by elapsed time ($\Delta T_i$). When at least two velocities have been calculated, an acceleration for the i measurement interval (or i power stroke) is calculated by taking the difference between velocity $V_i$ and velocity $V_{i+1}$ and dividing by elapsed time $\Delta T$ (preferably equal to $(\Delta T_i + \Delta T_{i+1}) / 2$).

In the preferred embodiment of the invention, decoder 30 generates a reference marker signal at a rate of once per cylinder firing, preferably at each angular position approximately corresponding to a maximum acceleration between each top dead center position of successive cylinders. For example, in a four-cylinder engine, the reference markers may be generated at a predetermined position falling in the range of about 80°–90° after top dead center. In a six-cylinder engine, reference marker signals can preferably be generated at a position falling in the range of from 50°–60° after top dead center. For an eight-cylinder engine, the preferred range is from about 35°–45° after top dead center. It has been experimentally determined that the maximum acceleration occurs just before a point midway between successive top dead centers.

The high resolution position sensor of FIG. 4 permits the reference marker signals to be generated at a selectable angular position. Thus, the same apparatus could be used for four, six, and eight-cylinder engines. Furthermore, such a high data rate apparatus may already be present on a vehicle within its ignition system.

Figure 5:
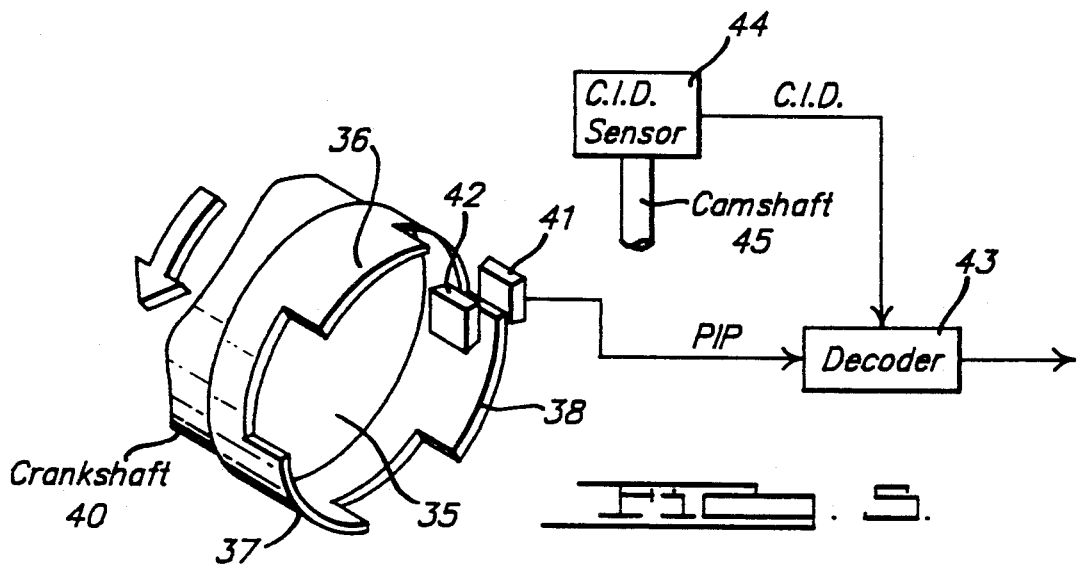
FIG. 5 is an alternative embodiment for measuring engine position.
Figure 6:
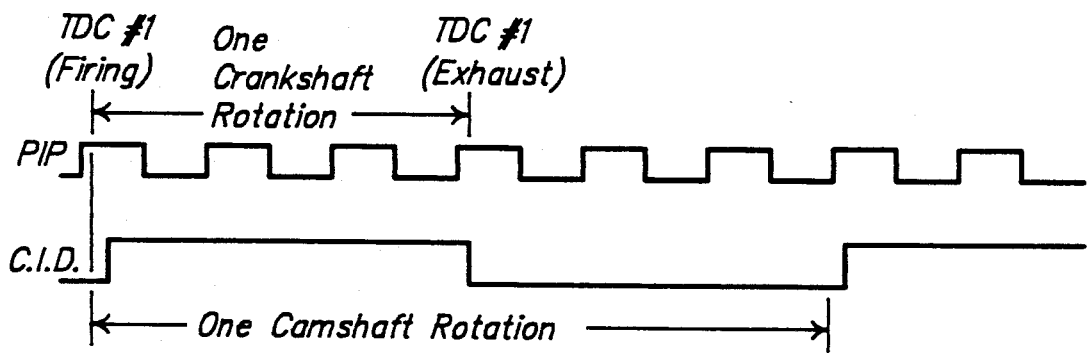
FIG. 6 is a waveform diagram showing position signals generated by the apparatus of FIG. 5.

Alternatively, some vehicles employ a lower data rate position sensing system such as is shown in FIG. 5 rather than a high data rate system as shown in FIG. 4. A wheel 35 includes vanes 36, 37, and 38 and rotates with the crankshaft 40 (a six-cylinder engine is shown in this example). The vanes pass between a hall sensor 41 and a permanent magnet 42 for generating a profile ignition pulse (PIP) signal during crankshaft rotation. Vanes 36–38 are typically arranged to generate a rising PIP signal just before top dead center of each respective cylinder. A rising PIP signal actually indicates the approach to top dead center of two engine cylinders, one of which is on a power stroke and one of which is on an intake stroke. A cylinder identification (CID) sensor 44 is connected to a camshaft 45 for identifying which of the two cylinders is actually on its power stroke. Since camshaft 45 rotates once for every two rotations of crankshaft 40, a CID signal is generated having a rising edge corresponding to top dead center in the power stroke of a predetermined cylinder (e.g., power stroke of cylinder No. 1). A decoder 43 receives the PIP signal and the CID signal and provides reference marker signals to counter 31 (FIG. 4). FIG. 6 shows waveforms for the PIP signal and the CID signal in relationship to the occurrence of top dead center of cylinder No. 1 Other relationships between the PIP signal, the CID signal, and the top dead center of cylinder No. 1 are, of course, possible depending on the positioning of whell 35 in relation to crankshaft 40.

Even within the constraints of the low data rate position system, the location of the velocity intervals can be modified according to the present invention to reduce cross-coupling between cylinders.

Figure 7A:
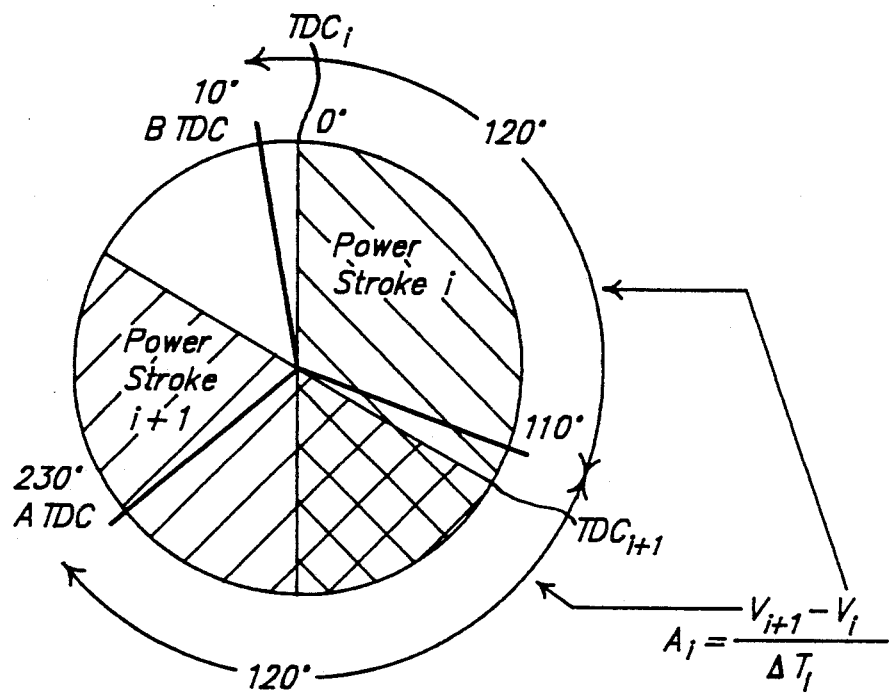
FIGS. 7A and 7B show a prior art phasing of the velocity measurement intervals and the corresponding erroneous effects on the resulting acceleration measurements for individual cylinders.
Figure 7B:
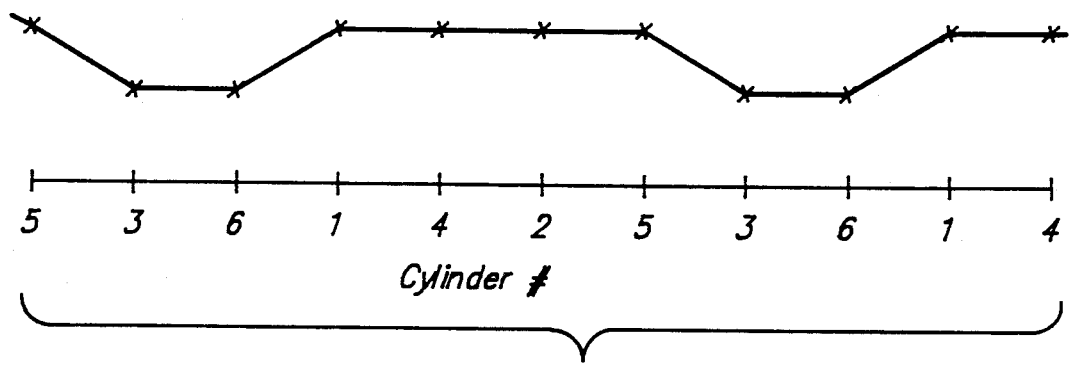

The prior art measurement of acceleration disclosed in James et al, and discussed above, corresponds to the use of a measurement interval beginning and ending on the rising edge of the PIP signal as shown in FIG. 6. As shown in FIG. 7A, a power stroke i begins at zero degrees or at the top dead center of power stroke i (TDC$_i$), and in a six-cylinder engine, a power stroke i+1 begins at a rotation position 120° after the top dead center of power stroke i. Each power stroke is 180° in length. Since the rising edge of PIP occurs at 10° before top dead center, a velocity interval for velocity $V_i$ begins at 10° before top dead center and ends at 110° after top dead center. A velocity interval $V_{i+1}$ begins at 110° after TDC$_i$ or equivalently at 10° before TDC$_{i+1}$. The acceleration calculation for power stroke i is determined by taking the difference between $V_{i+1}$ and $V_i$ and dividing by the elapsed time corresponding to velocity interval $V_i$ (average $\Delta T$ of the two intervals). FIG. 7B shows the results of acceleration calculations (measurements) using the velocity interval shown in FIG. 7A based on operation of a six-cylinder engine wherein cylinder No. 6 was operated with a misfire. Even though cylinder No. 3 was firing properly, its acceleration measurement is contaminated by (i.e., cross coupled with) the acceleration deficit in cylinder No. 6. Thus, it is not apparent from the drawing of FIG. 7B which cylinder or cylinders is misfiring or producing an acceleration deficit.

Figure 8A:
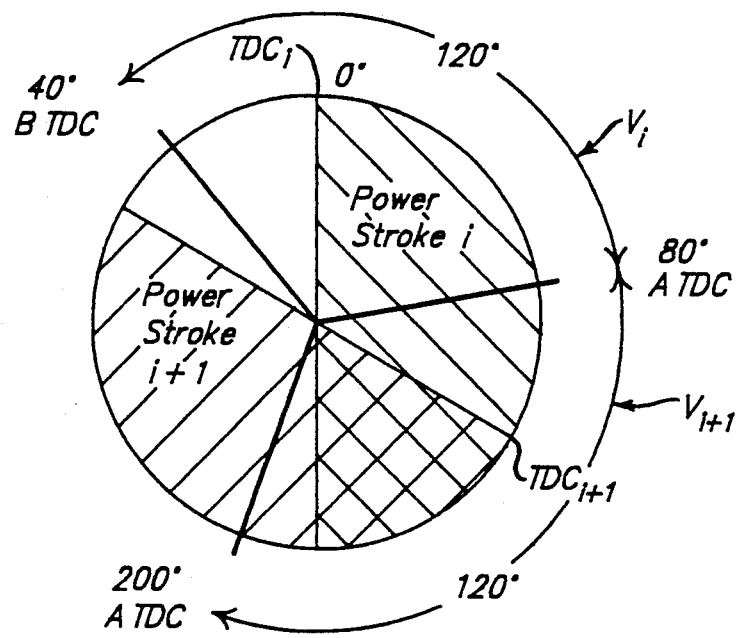
FIGS. 8A and 8B illustrate a modified phasing of the velocity measurement intervals and the corresponding improvement in the acceleration measurements.
Figure 8B:
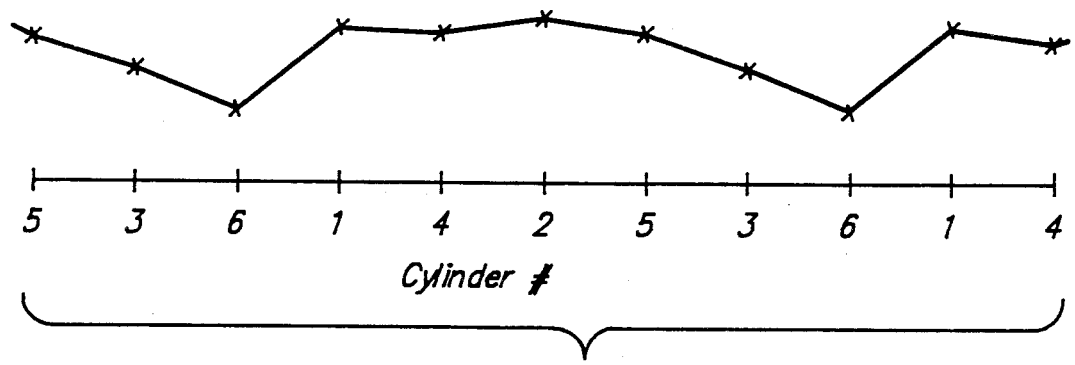

In FIG. 8A, the velocity measurement intervals are advanced by 30° in angular position resulting in some improvement. These velocity intervals could be achieved using the measuring apparatus of FIG. 4 or by reorienting the vaned wheel 35 in FIG. 5. As shown in FIG. 8B, the shifted velocity intervals result in an cylinder No. 6. However, cylinder No. 3 still reflects a negative impact even though it is known to be firing properly in this example.

Figure 9A:
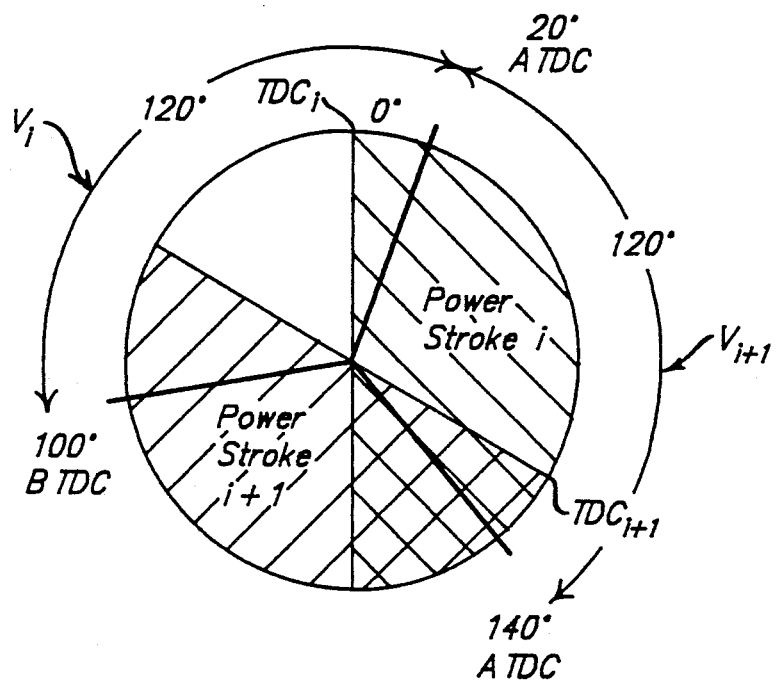
FIGS. 9A and 9B illustrate another modification of the velocity measurement intervals and the effects on the acceleration measurements.
Figure 9B:
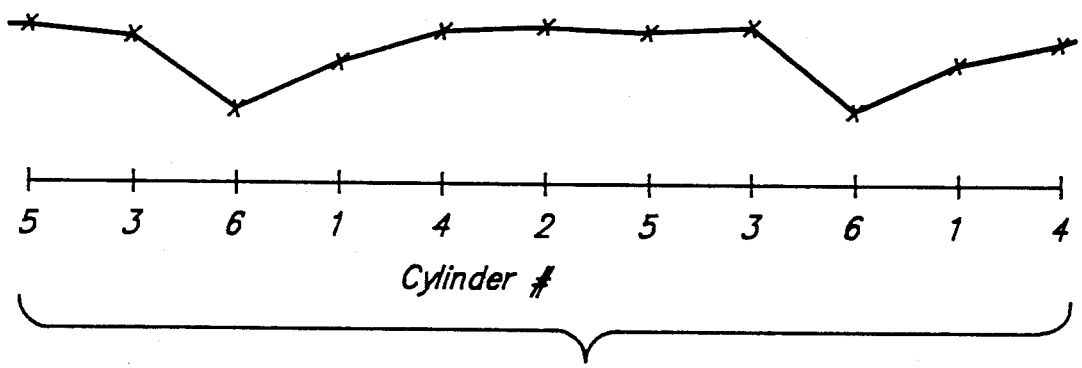

FIG. 9A illustrates velocity intervals wherein the reference marker signals are generated at 20° after top dead center also resulting in some improvement. Thus, the velocity interval for velocity $V_i$ begins at 100° before top dead center and extends to 20° after top dead center of power stroke i. In this case, the acceleration deficit of cylinder No. 6 is also seen in the succeeding firing of cylinder No. 1.

Figure 10A:
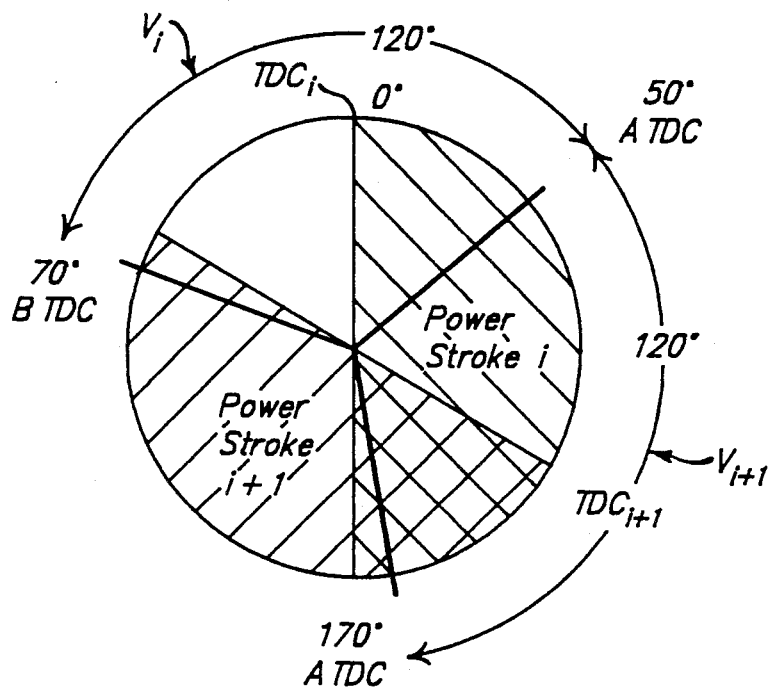
FIGS. 10A and 10B illustrate a preferred phasing for the velocity measurement intervals and the optimum separation of acceleration measurements according to individual power strokes.
Figure 10B:
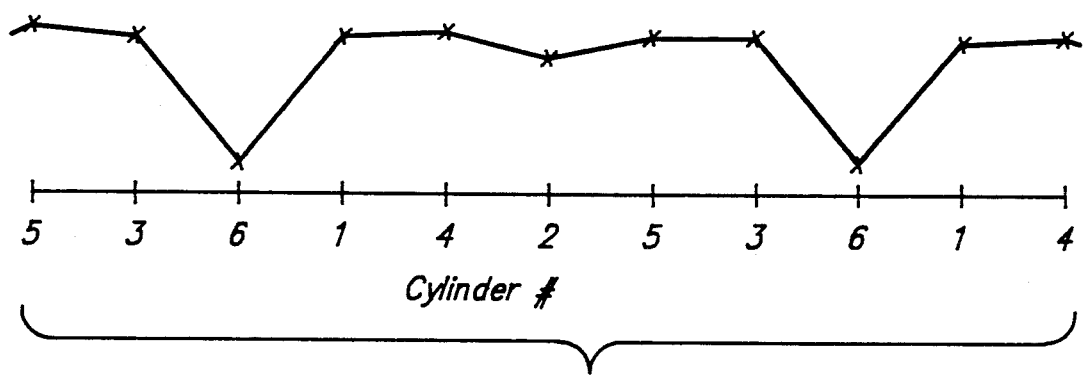

FIG. 10A shows velocity intervals determined in accordance with the best results. Reference marker signals are generated at 50° after top dead center such that a velocity measurement interval for power stroke i begins at 70° before TDC$_i$ and extends for 120° to a point at 50° after TDC$_i$. This interval corresponds to measuring elapsed time between falling edges of the PIP signal shown in FIGS. 5 and 6. The resulting acceleration measurements are shown in FIG. 10B. This embodiment results in the maximum separation between acceleration measurements such that the misfiring of cylinder No. 6 causes the corresponding acceleration measurement to exhibit a maximum drop and causes a small or substantially no drop in the succeeding and preceding acceleration measurements of cylinder Nos. 1 and 3. It has been further found that the optimum angular position between successive velocity intervals (i.e., the reference marker signals) is at the point where any effect of a deficit in the acceleration of cylinder No. 6 appears equally in the measurements corresponding to cylinder Nos. 1 and 3. In other words, when the velocity intervals are selected such that the cross-coupling effects on measurements for the preceding and succeeding power strokes are equal, those effects will also be a their minimum.

The foregoing has described method and apparatus for deriving acceleration measurements for each power stroke which require just one velocity measurement per power stroke. Measurement errors and uncertainties are minimized since long velocity intervals are used and there is no need to measure any instantaneous speed at any point within the rotation of the engine.

While preferred embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the spirit and scope of the invention.

What is claimed is:

1. A method for determining crankshaft acceleration corresponding to individual power strokes of an internal combustion engine, said method comprising the steps of:

providing position signals at predetermined points of the rotation of said combustion engine, said points being at substantially regularly spaced rotation angles such that at least one position signal occurs during every power stroke;

establishing one velocity measurement interval for each power stroke, each velocity measurement interval including between about 45° and 180° of rotation of said crankshaft;

measuring a time period during each respective velocity measurement interval; and calculating said acceleration corresponding to each individual power stroke as a function of the difference between the time period for each individual power stroke and the time period for the next successive power stroke;

wherein each velocity measurement interval has a phase in relation to its respective power stroke such that a loss of power occurring in a particular power stroke causes a drop in the calculated acceleration corresponding to said particular power stroke and causes a smaller but substantially equal drop in the calculated accelerations corresponding to the power strokes immediately preceding and immediately following said particular power stroke.

2. A method for determining crankshaft acceleration corresponding to individual power strokes of an internal combustion engine, said method comprising the steps of:

providing position signals at predetermined points of the rotation of said combustion engine, said points being at substantially regularly spaced rotation angles such that at least one position signal occurs during every power stroke;

measuring a first time period of rotation through a first rotation interval defined by first selected position signals separated by at least about 45° of rotation and measuring a second time period of rotation through a second rotation interval defined by second selected position signals separated by at least about 45° of rotation, each rotation interval including at least a portion of a selected power stroke, said first and second rotation intervals being substantially symmetrical with respect to a rotational position within said selected power stroke where a maximum acceleration would approximately occur during a proper firing thereof; and determining said acceleration based on the difference between said first and second measured time periods.

3. The method of claim 2 wherein said position signals are in the form of a square wave having one positive transition per power stroke.

4. The method of claim 3 wherein said positive transition occurs near the beginning of each power stroke and wherein said square wave has a negative transition at each rotational position substantially halfway between successive positive transitions.

5. The method of claim 4 wherein said first selected position signals and said second selected position signals are all comprised of a negative transition.

6. The method of claim 2 wherein the end of said first rotation interval and the beginning of said second rotation interval substantially conincide with a rotational position halfway between the beginning of said selected power stroke and the beginning of the next successive power stroke.

7. The method of claim 2 wherein said first rotation interval has a midpoint substantially coincident with the beginning of said selected power stroke and wherein said second rotation interval has a midpoint substantially coincident with the beginning of the next successive power stroke.

8. The method of claim 2 wherein said first rotation interval further includes a portion of the power stroke immediately preceding said selected power stroke.

9. The method of claim 2 wherein said second rotation interval further includes a portion of the power stroke immediately succeeding said selected power stroke.

10. The method of claim 2 wherein said second time period becomes a first time period for determining an acceleration corresponding to the power stroke immediately succeeding said selected power stroke.

11. Apparatus for measuring acceleration corresponding to individual power strokes of an internal combustion engine comprising:

position sensor means for generating position signals at predetermined rotational positions of said engine, at least one predetermined rotational position occurring during each power stroke of said engine;

a clock generating clock pulses at a frequency equal to at least about 1 megahertz;

interval means coupled to said position sensor means and said clock for counting said clock pulses during a first rotation interval and during a second rotation interval to obtain first and second counts, respectively, said first and second rotation intervals each including at least about 45° of rotation of said engine and at least a portion of a selected power stroke, said first and second rotation intervals being substantially symmetrical with respect to a point within said selected power stroke where a maximum acceleration would approximately occur during a proper firing thereof; and calculating means coupled to said interval means for calculating said acceleration corresponding to said selected power stroke in proportion to the difference of the reciprocals of said first and second counts.

12. The apparatus of claim 11 wherein said position sensor means is comprised of:

a rotor for rotation with the crankshaft of said engine having reference marks at predetermined positions; and stationary pickup means for sensing the passage of said reference marks.

13. The apparatus of claim 11 wherein said position signals are comprised of an electrical square wave having alternate rising and falling edges.

14. The apparatus of claim 13 wherein one rising edge and one falling edge occurs between the beginning points of successive power strokes, said first rotation interval ending and said second rotation interval beginning at the rising or falling edge occurring at a position nearest to a midpoint at or just before halfway between said beginning points.

* * * * *